(12) United States Patent
Nakahara et al.

(10) Patent No.: US 6,459,403 B1
(45) Date of Patent: Oct. 1, 2002

(54) TRAFFIC CONTROL SYSTEM

(75) Inventors: Tsuneo Nakahara, Osaka; Michihisa Kyoto; Shunji Otani, both of Tokyo, all of (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 6 days.

(21) Appl. No.: 09/668,173

(22) Filed: Sep. 25, 2000

(30) Foreign Application Priority Data

Sep. 29, 1999 (JP) .......................................... 11-276768

(51) Int. Cl.⁷ ........................ G01S 13/86; G01S 13/93
(52) U.S. Cl. ............................ 342/52; 342/58; 342/69; 342/357.08; 342/456; 342/457; 340/903; 340/917
(58) Field of Search ............................ 342/70, 71, 72, 342/57, 58, 61, 69, 29, 357.07, 357.08, 357.09, 357.1, 357.13, 455, 456, 457, 463; 340/436, 903, 905, 906, 914, 917; 701/120, 214, 27, 98

(56) References Cited

U.S. PATENT DOCUMENTS 5,714,948 A * 2/1998 Farmakis et al. ............ 340/961
5,983,161 A * 11/1999 Lemelson et al. ........... 701/301
6,226,389 B1 * 5/2001 Lemelson et al. ........... 382/104
6,275,773 B1 * 8/2001 Lemelson et al. ........... 701/301
6,317,058 B1 * 11/2001 Lemelson et al. ........... 340/910

FOREIGN PATENT DOCUMENTS

| JP | 7-29091 | 1/1995 |
| JP | 8-221685 | 8/1996 |

* cited by examiner

*Primary Examiner*—John B. Sotomayor
(74) *Attorney, Agent, or Firm*—McDermott, Will & Emery

(57) ABSTRACT

A satellite 10 in the sky has an imaging radar and a captured image data transmitting means, and captures an image of a predetermined subject area A including roads R. According to the captured image data concerning the subject area A, a traffic control section 21 grasps the state of traffic in the subject area A, and estimates a state of congestion according to thus grasped state of traffic. Also, according to thus estimated state of congestion, the traffic control section 21 sets parameters such as on/off times of signals. Thus set parameters are sent from the traffic control section 21 to their corresponding signals. The on/off of each signal is controlled according to the set parameters. Hence, the state of traffic in a wide area can be grasped quite accurately, and traffic can be controlled according to thus grasped state of traffic.

6 Claims, 2 Drawing Sheets

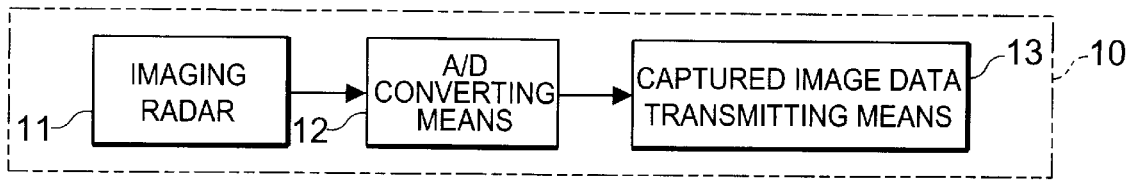
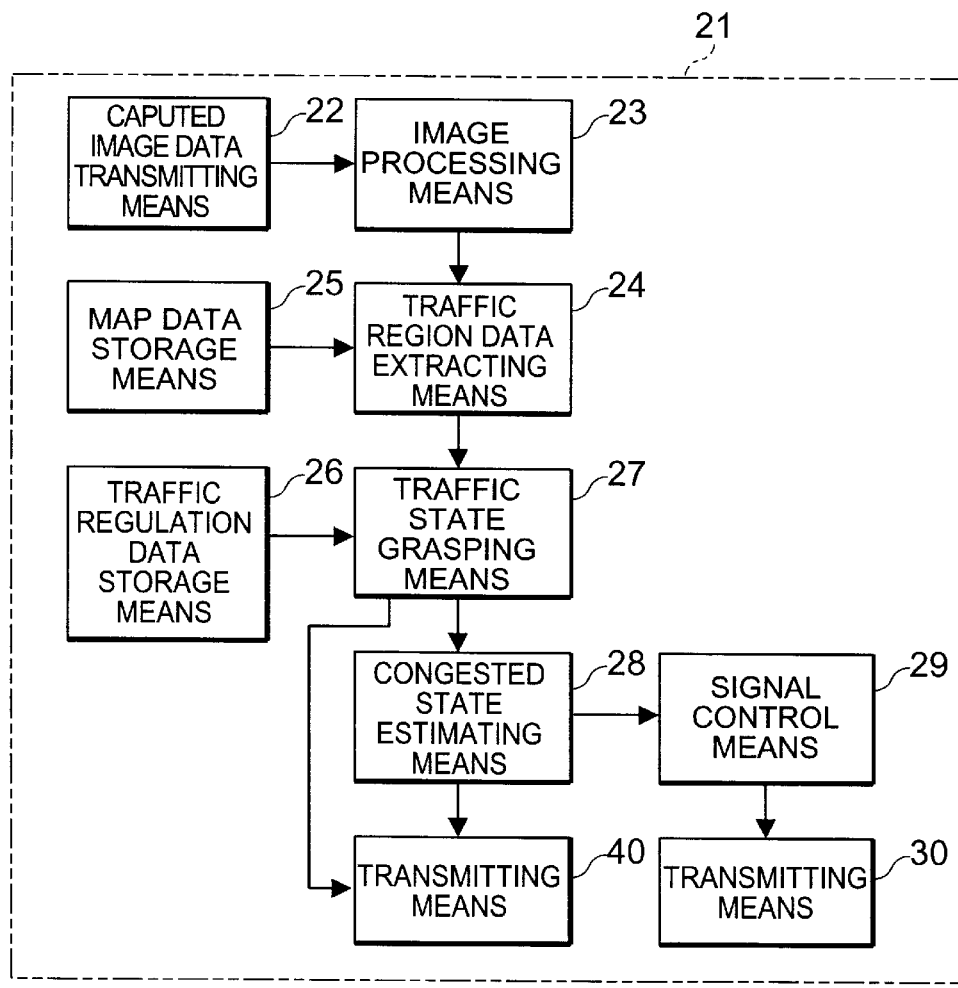

TRAFFIC CONTROL SYSTEM

BACKGROUND OF THE INVENTION

1. Field of the Invention

The present invention relates to a traffic control system for controlling traffic of vehicles such as cars.

2. Related Background Art

Known as such a kind of traffic control system is one disclosed in Japanese Patent Application Laid-Open No. HEI 7-29091. This traffic control system computes traffic volume data for each intersection according to captured image data obtained by a TV camera disposed above a road near the intersection. Its centralized monitoring center collects and analyzes traffic volume data obtained at a plurality of intersections, so as to set respective on/off times of signals optimal for eliminating traffic jams at the intersections, thereby controlling the signals according to thus set on/off times.

Also known as a traffic monitoring system for monitoring the state of traffic is one disclosed in Japanese Patent Application Laid-Open No. HEI 8-221658, for example. In this traffic monitoring system, an SAR (Synthetic Aperture Radar) is mounted as an imaging radar in an airship, information acquired by the SAR is sent to a ground station, and an information processing unit in the ground station analyzes thus sent information as an image, so as to determine the length of vehicles in congestion and the like, thereby providing thus determined information as traffic information.

SUMMARY OF THE INVENTION

However, the traffic control system disclosed in Japanese Patent Application Laid-Open No. HEI 7-29091 carries out image processing for the images captured by TV cameras disposed above roads near intersections, thereby being problematic in that only data within a quite limited area near intersections can be processed. For accurately grasping the state of traffic, TV cameras may further be disposed at not only the intersections but also many other places, so as to monitor images from these TV cameras, thereby getting hold of the state of traffic, which changes depending on time and place. However, there have been restrictions concerning the cost of TV cameras, their cost of installation, how to secure a space for installing TV cameras, and so forth, whereby it has been practically impossible for TV cameras to be installed at places other than intersections, main intersections to be exact, thus imposing a limit on accurately grasping the state of traffic.

On the other hand, the traffic control system disclosed in Japanese Patent Application Laid-Open No. HEI 8-221685 merely provides vehicles and the like with traffic information obtained from information acquired by the SAR mounted in an airship in the sky, and is not configured so as to control traffic according to the information acquired by the SAR.

In view of such circumstances, it is an object of the present invention to provide a traffic control system which can grasp the state of traffic in a wide area and control the traffic according to thus grasped state of traffic.

The traffic control system in accordance with the present invention comprises imaging means, disposed in a flying object, for capturing an image of a predetermined subject area including a road from thereabove and outputting thus captured image data; captured image data transmitting means, disposed in the flying object, for transmitting via a wireless communication line the captured image data outputted from the imaging means; captured image data receiving means for receiving the captured image data transmitted from the captured image data transmitting means; traffic state grasping means for grasping a state of traffic in the subject area according to the captured image data received by the captured image data receiving means; and traffic control means for controlling traffic according to the state of traffic in the subject area grasped by the traffic state grasping means.

In the traffic control system in accordance with the present invention, a flying object is provided with imaging means and captured image data transmitting means, whereas traffic state grasping means captures the state of traffic in the subject area according to the captured image data received by the captured image data receiving means, whereby not only the state of traffic over a wide area can be grasped at once, but also the state of traffic in the subject area can be captured two-dimensionally. As a result, the state of traffic in a wide area can be grasped quite accurately. Also, since a single piece of imaging means can grasp, the state of traffic over a wide area, the traffic monitoring system can lower its cost. Further, since traffic control means controls traffic according to the state of traffic in the subject area grasped by the traffic state grasping means, appropriate traffic control can be carried out in a wide area.

Preferably, the traffic control means controls a parameter of a signal so as to regulate the number of passing vehicles. In the case with such a configuration, the number of vehicles passing the signal is regulated by signal control means according to the state of traffic grasped by the traffic state grasping means, whereby appropriate traffic control for eliminating congested states and the like can be carried out according to the very accurate state of traffic grasped by the traffic state grasping means.

Preferably, the traffic control system further comprises traffic region data extracting means for extracting data of a vehicle traveling region from within the captured image data according to map data, whereas the traffic state grasping means grasps data concerning a traffic volume in the vehicle traveling region according to the data of vehicle traveling region extracted by the traffic region data extracting means. As a consequence, data concerning traffic volumes such as the number of vehicles and vehicle speeds in the vehicle traveling region can be grasped appropriately and easily.

Preferably, the traffic control system further comprises traffic region data extracting means for extracting data of a parking region from within the captured image data according to map data, whereas the traffic state grasping means grasps data concerning vehicles in the parking region according to the data of parking region extracted by the traffic region data extracting means. As a consequence, data concerning parked vehicles such as the number of vehicles parked in the parking region can be grasped appropriately and easily.

Preferably, the imaging means is an imaging radar mounted in the flying object. As a consequence, image data in a very wide area can be obtained.

Preferably, the traffic control system further comprises congestion information providing means for providing a driver with traffic congestion information according to the state of traffic grasped by the traffic state grasping means. As a consequence, the driver can easily see traffic congestion information such as the length of congestion in a highway and the time required for the travel to a destination.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a block diagram of a satellite included in the traffic control system in accordance with the embodiment of the present invention; and FIG. 3 is a block diagram of a traffic monitoring section included in the traffic control system in accordance with the embodiment of the present invention.

DESCRIPTION OF THE PREFERRED EMBODIMENTS

Figure 1:
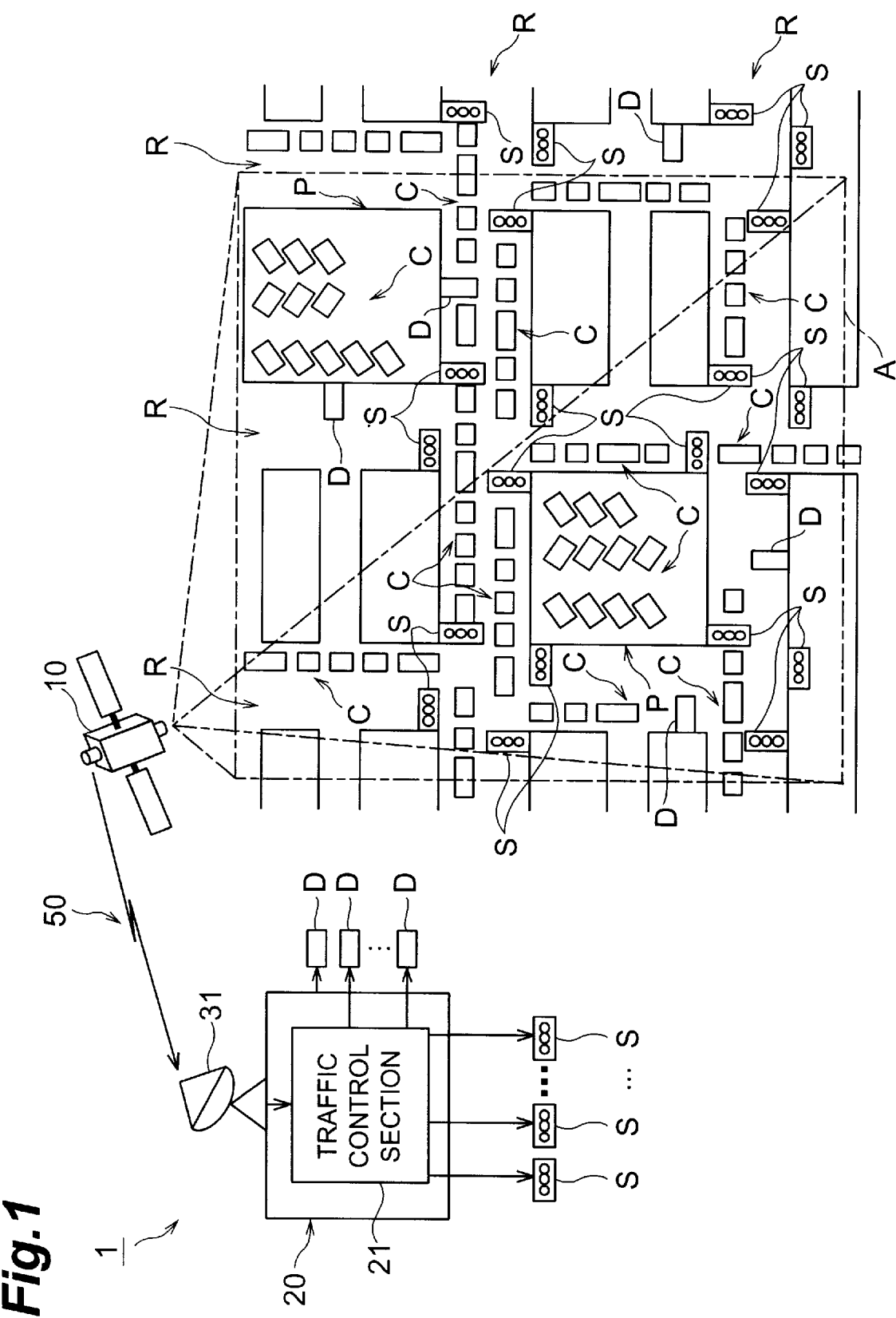
FIG. 1 is a schematic view showing the overall configuration of the traffic control system in accordance with an embodiment of the present invention.

In the following; a preferred embodiment of the traffic control system in accordance with the present invention will be explained in detail with reference to the drawings. In the explanation of the drawings, constituents identical to each other will be referred to with numerals or letters identical to each other, without repeating their overlapping descriptions.

FIG. 1 is a schematic view showing the overall configuration of the traffic control system in accordance with the embodiment. The traffic control system 1 includes a satellite 10 flying in the sky and a ground station 20 positioned on the ground.

The satellite 10 in the sky is a low-earth-orbiting satellite and has, as shown in FIG. 2, an imaging radar 11 as imaging means, an A/D converting means 12, and a captured image data transmitting means 13. The imaging radar 11 is used for capturing an image of a predetermined subject area A including roads R. In this embodiment, an SAR (Synthetic Aperture Radar) is employed therefor. Though an RAR (Real Aperture Radar) may be used in place of the SAR, it is preferable to use the SAR since it can yield images with a higher resolution than the RAR does. If the SAR is used, then the viewing width will extend over about 100 km, and a resolution on the order of ten-odd meters can be attained.

The output from the imaging radar 11 is connected to the A/D converting means 12, so as to input the captured image data acquired by the imaging radar 11 to the A/D converting means 12. Thus inputted captured image data are A/D-converted by the A/D converting means 12, which then outputs the resulting digital data. The output from the A/D converting means 12 is sent to the captured image data transmitting means 13. The captured image data transmitting means 13 is connected to a satellite communication line network 50 acting as a wireless communication line, and is used for wirelessly transmitting the A/D-converted captured image data outputted from the A/D converting means 12. The A/D-converted captured image data are transmitted from the captured image data transmitting means 13 to a traffic control section 21 on the ground by way of the satellite communication line network 50.

The ground station 20 has the traffic control section 21 and an external antenna 31. As shown in FIG. 3, the traffic control section 21 has a captured image data receiving means 22, an image processing means 23, a traffic region data extracting means 24, a map data storage means 25, a traffic regulation data storage means 26, a traffic state grasping means 27, a congested state estimating means 28, a signal control means 29, and a transmitting means 30. Here, the signal control means 29 functions as traffic control means. The captured image data receiving means 22 is a communicating apparatus to be connected to the satellite communication line network 50 by way of the external antenna 31, and receives the captured image data sent from the captured image data transmitting means 13 of the satellite 10. The output from the captured image data receiving means 22 is connected to the image processing means 23. The captured image data are sent to the image processing mean 23 from the captured image data transmitting means 13. After being processed in the image processing means 23 by use of a known technique, the image data are sent from the image processing means 23 to the traffic region data extracting means 24.

Map data such as topographic maps and road maps are stored in the map data storage means 25. The traffic region data extracting means 24 reads out map data from the map data storage means 25; and, according to the map data, extracts as vehicle traveling region data the part of data corresponding to vehicle traveling regions such as roads R from within the image data sent from the image processing means 23. Also, according to the map data, the traffic region data extracting means 24 extracts as parking region data the part of data corresponding to parking regions such as parking lots P from within the image data sent from the image processing means 23. Therefore, as the traffic region data of the image data sent from the image processing means 23, the vehicle traveling region data and parking region data are extracted in the traffic region data extracting means 24. The traffic region data extracting means 24 sends thus extracted vehicle traveling region data and parking region data to the traffic state grasping means 27.

Location data of traffic control instruments such as signals and traffic regulation data such as speed limits, one-way traffic, and impassability are stored in the traffic regulation data storage means 26. According to the vehicle traveling region data and parking area data sent from the traffic region data extracting means 24, the traffic state grasping means 27 grasps data concerning traffic volumes such as the number of vehicles and vehicle speed in the vehicle traveling regions, and data concerning the vehicles in the parking regions such as the number of vehicles parked in the parking regions. The individual data as the state of traffic grasped by the traffic state grasping means 27 are sent to the congested state estimating means 28.

According to reflected waves of the radar in the vehicle traveling region data from the traffic region data extracting means 24, the traffic state grasping means 27 grasps the number of vehicles. For example, if the location data of signals are read out from the traffic regulation data storage means 26, then the number of vehicles between the signals can be grasped from the waves of radar reflected from vehicles C on the roads between the signals. If thus grasped number of vehicles is divided by the distance between the signals, then the number of vehicles per unit distance (vehicle number density) can also be grasped. Similarly, the traffic state grasping means 27 can grasp the number of vehicles parked in the parking lots P according to reflected waves of the radar in the parking region data from the traffic region data extracting means 24.

Also, according to the Doppler-shifted amount of reflected waves of the radar in the vehicle traveling region data from the traffic region data extracting means 24, the traffic state grasping means 27 grasps vehicle speeds. For example, if location data of signals are read out from the traffic regulation data storage means 26, and a Doppler frequency distribution of reflected waves of the radar from vehicles C on the roads R between the signals is determined, then a vehicle speed distribution between the signals can be grasped from this Doppler frequency distribution, whereby the average speed between the signals can also be grasped.

The congested state estimating means 28 estimates a congested state according to the individual data sent from the traffic state grasping means 27, and sends congestion estimation data to the signal control means 29 as a result of estimation. The congested state estimating means 28 is configured so as to comprehensively estimate a congested state according to respective states of traffic in a plurality of different subject areas A. The signal control means 29 is used for controlling on/off states of signals S by setting parameters such as respective on/off times of the signals S. According to the congestion estimation data sent from the congested state estimating means 28, the signal control means 29 sets parameters such as respective on/off times of the signals S. The parameters such as respective on/off times of the signals S set by the signal control means 29 are sent to their corresponding signals S from the transmitting means 30. Parameters such as on/off times are controlled by the signal control means 29 not only in the signals S within the subject area for controlling traffic but also in those in its surroundings. As a consequence, the traffic control in the subject area is regulated while keeping a balance with its surroundings.

Operations of the traffic control system 1 will now be explained. When the imaging radar 11 of the satellite 10 captures an image of the subject area A including roads R, vehicles C, parking lots P, and the like, captured image data are A/D-converted by the A/D converting means 12, and then the resulting digital captured image data are fed into the captured image data transmitting means 13 and then are transmitted from the captured image data transmitting means 13 to the captured image data receiving means 22 in the traffic control section 21 by way of the satellite communication line network 50. The captured image data received by the captured image data receiving means 22 are fed into the image processing means 23, as to be subjected to image processing, and then are sent to the traffic region data extracting means 24 as image data.

When the image data are sent to the traffic region data extracting means 24, vehicle traveling region data and parking region data are extracted from within the image data in the traffic region data extracting means 24 according to the map data read out from the map data storage means 25. Thus extracted vehicle traveling region data and parking region data are sent to the traffic state grasping means 27. When the vehicle traveling region data and parking region data are sent to the traffic state grasping means 27, it grasps data concerning traffic volumes such as the number of vehicles and vehicle speeds in vehicle traveling regions and data concerning vehicles in parking regions such as the number of vehicles parked in the parking regions, and thus grasped individual data are sent to the congested state estimating means 28.

Then, according to the data concerning traffic volumes such as the number of vehicles and vehicle speeds in vehicle traveling regions and data concerning parked vehicles such as the number of vehicles parked in parking regions, the congested state estimating means 28 estimates a congested state, and this result of estimation is sent to the signal control means 29. The signal control means 29 sets parameters of signals S such as respective on/off times of the signals S, such that the number of vehicles C passing each intersection is adjusted so as to alleviate the congestion. Thus set parameters are sent to their corresponding signals S by the transmitting means 30, whereby the individual signals S are turned on/off according to thus sent parameters.

In the traffic control system 1 of this embodiment, as in the foregoing, the satellite 10 is provided with the imaging radar 11 and the captured image data transmitting means 13, whereas the traffic control section 21 (traffic state grasping means 27) captures the state of traffic according to the captured image data received by the captured image data receiving means 22, whereby the state of traffic over a wide area can be grasped at once, and the state of traffic can be captured two-dimensionally. As a result, the state of traffic i[008e] wide area can be grasped quite accurately. Also, since the single imaging radar 11 can grasp the state of traffic over a wide area, a lower cost can be attained in the whole system for monitoring the state of traffic.

The traffic control section 21 is provided with the signal control means 29, and regulates the number of vehicles passing signals according to the congestion estimation data from the congested state estimating means 28. Therefore, according to the congestion estimation data estimated from the very accurate traffic state grasped by the traffic state grasping means 27, appropriate traffic control for eliminating the congested state and so forth can be carried out in a wide area.

Also, the traffic control section 21 has the traffic region data extracting means 24 for reading out map data from the map data storage means 25 and extracting, according to thus read-out map data, vehicle traveling region data such as roads from within the image data sent from the image processing means 23. Since the traffic state grasping means 27 grasps data concerning traffic volumes such as the number of vehicles and vehicle speeds in vehicle traveling regions according to the vehicle traveling region data extracted by the traffic region data extracting means 24, the data concerning traffic volumes such as the number of vehicles and vehicle speeds in the vehicle traveling regions can be grasped appropriately and easily.

The traffic region data extracting means 24 also reads out map data from the map data storage means 25 and extracts, according to thus read-out map data, parking region data such as parking lots from within the image data sent from the image processing means 23. Since the traffic state grasping means 27 grasps data concerning vehicles in parking regions such as the number of vehicles parked in the parking regions according to the parking region data extracted by the traffic region data extracting means 24, the data concerning vehicles in the parking regions (the number of parked vehicles and the like) can be grasped appropriately and easily.

Since the satellite 10 is provided with the imaging radar 11, image data can be obtained in a very wide area.

Though the satellite 10 is used as a flying object in this embodiment, any object such as an airship, for example, may be used as long as it can fly in the sky. Also, the number of flying objects (satellite 10) is not restricted to 1, but a plurality of flying objects (satellites 10) may be used.

Since the number of vehicles parked in parking lots P can be grasped in this embodiment, the state of congestion after an event in the vicinity of the place where the event is held can be estimated according to the number of cars in the parking lots for the place of event and information concerning the closing time of the event, for example.

While the traffic control section 21 is configured so as to grasp the state of congestion in particular as the state of traffic in this embodiment, it may be configured so as to grasp places where disasters such as accidents have occurred, places under construction, and the like according to captured image data (SAR sensor images).

Also, information display means D, such as electric bulletin boards, for notifying vehicles C of the state of traffic may be provided. Various kinds of data concerning the state of traffic grasped by the traffic state grasping means 27 or the congestion estimation data estimated by the congested state estimating means 28 may be displayed on the information display means D, so as to provide vehicles (drivers) with information about traffic congestion. Various kinds of data concerning the state of traffic grasped by the traffic state grasping means 27 or the congestion estimation data estimated by the congested state estimating means 28 are sent from a transmitting means 40 connected to the traffic state grasping means 27 and congested state estimating means 28. If the information display means D (congestion information providing means) for providing various kinds of data concerning the state of traffic grasped by the traffic state grasping means 27 or traffic congestion information such as the congestion estimation data estimated by the congested state estimating means 28 are disposed, then drivers can easily see traffic congestion information such as the length of congestion in a highway and the time required for the travel to a destination. Also, instead of the displaying onto the information display means D, other congestion information providing means such as a wireless system for communicating traffic congestion information to vehicles (drivers) may be used.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traffic control system comprising:

imaging means, disposed in a flying object, for capturing an image of a predetermined subject area including a road from thereabove and outputting thus captured image data;

captured image data transmitting means, disposed in said flying object, for transmitting via a wireless communication line said captured image data outputted from said imaging means;

captured image data receiving means for receiving said captured image data transmitted from said captured image data transmitting means;

traffic state grasping means for grasping a state of traffic in said subject area according to said captured image data received by said captured image data receiving means; and traffic control means for controlling traffic according to said state of traffic in said subject area grasped by said traffic state grasping means.

2. A traffic control system according to claim 1, wherein said traffic control means controls a parameter of a signal so as to regulate the number of passing vehicles.

3. A traffic control system according to claim 1, further comprising traffic region data extracting means for extracting data of a vehicle traveling region from within said captured image data according to map data;

wherein said traffic state grasping means grasps data concerning a traffic volume in said vehicle traveling region according to data of said vehicle traveling region extracted by said traffic region data extracting means.

4. A traffic control system according to claim 1, further comprising traffic region data extracting means for extracting data of a parking region from within said captured image data according to map data;

wherein said traffic state grasping means grasps data concerning a vehicle in said parking region according to data of said parking region extracted by said traffic region data extracting means.

5. A traffic control system according to claim 1, wherein said imaging means is an imaging radar mounted in said flying object.

6. A traffic control system according to claim 1, further comprising congestion information providing means for providing a driver with traffic congestion information according to said state of traffic grasped by said traffic state grasping means.

* * * * *